United States Patent
Zhou et al.

(10) Patent No.: US 10,529,001 B2
(45) Date of Patent: Jan. 7, 2020

(54) ELICIT USER DEMANDS FOR ITEM RECOMMENDATION

(71) Applicant: International Business Machines Corporation, Armonk, NY (US)

(72) Inventors: Xin Zhou, Beijing (CN); Li Jun Mei, Beijing (CN); Qi Cheng Li, Beijing (CN); Yan Gao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/652,620

(22) Filed: Jul. 18, 2017

(65) Prior Publication Data

US 2019/0026813 A1    Jan. 24, 2019

(51) Int. Cl.
   *G06Q 30/06*   (2012.01)
   *G06Q 30/02*   (2012.01)
   *G06F 16/22*   (2019.01)

(52) U.S. Cl.
   CPC ..... *G06Q 30/0631* (2013.01); *G06F 16/2246* (2019.01); *G06Q 30/0203* (2013.01)

(58) Field of Classification Search
   None
   See application file for complete search history.

(56) References Cited

U.S. PATENT DOCUMENTS

| | | | |
|---|---|---|---|
| 6,829,603 B1 | 12/2004 | Chai et al. | |
| 7,505,921 B1 * | 3/2009 | Lukas | G06Q 30/0603 705/26.5 |
| 7,596,513 B2 | 9/2009 | Fargo | |
| 2004/0267607 A1 * | 12/2004 | Maddux | G06F 17/27 705/7.42 |
| 2005/0108094 A1 | 5/2005 | Hugron et al. | |
| 2006/0085286 A1 * | 4/2006 | Lutnick | G06Q 10/06 705/26.7 |
| 2010/0179916 A1 * | 7/2010 | Johns | G06Q 30/02 705/319 |
| 2011/0093361 A1 | 4/2011 | Morales | |
| 2011/0125783 A1 * | 5/2011 | Whale | G06F 17/30011 707/769 |

(Continued)

FOREIGN PATENT DOCUMENTS

| | | | |
|---|---|---|---|
| GB | 2517358 | * | 2/2015 |
| WO | WO2014118975 | * | 8/2014 |

OTHER PUBLICATIONS

Zhou et al., "Elicit User Demands for Item Recommendation", U.S. Appl. No. 15/814,774, filed Nov. 16, 2017, 42 pages.

(Continued)

*Primary Examiner* — Leland Marcus
(74) *Attorney, Agent, or Firm* — Monchai Chuaychoo

(57) ABSTRACT

In an approach for eliciting user demands for item recommendation, one or more computer processors retrieve one or more items based on a user demand. The one or more computer processors update the one or more items based on the user demand. The one or more computer processors extract the one or more representative words corresponding to the one or more items. The one or more computer processors build a candidate item list based on the one or more representative words. The one or more computer processors generate one or more eliciting questions to help a user select an item based on the candidate item list.

10 Claims, 6 Drawing Sheets

(56) References Cited

U.S. PATENT DOCUMENTS

| | | | | |
|---|---|---|---|---|
| 2012/0296967 | A1* | 11/2012 | Tao | G06Q 30/0251 709/204 |
| 2013/0036191 | A1* | 2/2013 | Fink | G06F 16/9577 709/217 |
| 2013/0290339 | A1 | 10/2013 | LuVogt et al. | |
| 2013/0325627 | A1* | 12/2013 | Kimmerling | G06F 17/30386 705/14.66 |
| 2013/0325839 | A1* | 12/2013 | Goddard | G06F 16/9537 707/708 |
| 2014/0040176 | A1 | 2/2014 | Balakrishnan et al. | |
| 2015/0310072 | A1* | 10/2015 | Dietz | G06F 16/22 707/741 |
| 2016/0239551 | A1 | 8/2016 | Ovsjanikovs et al. | |
| 2017/0032468 | A1* | 2/2017 | Wang | G06Q 40/123 |
| 2017/0148084 | A1* | 5/2017 | Axelsson | G06F 17/30522 |
| 2018/0053142 | A1* | 2/2018 | Martin | G06F 17/30648 |

OTHER PUBLICATIONS

IBM Appendix P, list of patents and patent applications treated as related, filed herewith, 2 pages.

Jaiswal et al., "Online shopping recommendation optimization based on users previous search history", International Research Journal of Engineering and Technology(IRJET), vol. 03, Issue: 04, Apr. 2016, <https://www.irjet.net/archives/V3/i4/IRJET-V3I4348.pdf>, 5 pages.

Mell et al., "The NIST Definition of Cloud Computing", National Institute of Standards and Technology, U.S. Department of Commerce, Special Publication 800-145, Sep. 2011, 7 pages.

Sun et al., "Learning Multiple-Question Decision Trees for Cold-Start Recommendation", WSDM'13, Feb. 4-8, 2013, Rome, Italy. Copyright 2013 ACM 978-1-4503-1869—Mar. 13, 2002, <http://theanalysisofdata.com/gl/wsdm2012sun.pdf>, 10 pages.

Yang et al, "Beyond Query: Interactive User Intention Understanding", 2015 IEEE International Conference on Data Mining, © 2015 IEEE, DOI 10.1109/ICDM.2015.113, <https://www.semanticscholar.org/paper/Beyond-Query-Interactive-User-Intention-Yang-Tang/e01fa0abbf7bce9c54eea1995816043ed55de903>, 10 pages.

* cited by examiner

ELICIT USER DEMANDS FOR ITEM RECOMMENDATION

BACKGROUND OF THE INVENTION

The present application generally relates to data processing, and more specifically, to eliciting user demands for item recommendation.

Item recommendation has becoming extremely common in recent years, it has been utilized in a variety of areas including movies, music, news, books, research articles, search queries, social tags, and products or services in general. Accurate user demands are an important prerequisites for high performance item recommendation. Analyzing a user's profile and/or his/her historical behavior is a widely-applied approach to mine user demands, however it typically fails when required data is missing or insufficient. Therefore it's still inevitable to get the demands from the user directly.

SUMMARY

According to an embodiment of the present invention, a computer implemented method, in which at least one item is retrieved based on a user demand and the retrieved at least one item is updated based on the user demand. Then at least one representative word is extracted for each of the updated at least one item respectively. A candidate item list is further built based on the extracted at least one representative word and at least one eliciting question is generated to help the user select an item based on the candidate item list.

According to another embodiment of the present invention, a computer system comprises of a processor and a computer-readable memory coupled to the processor, with the memory comprising instructions when executed by the processor performing actions of: retrieving at least one item based on a user demand; updating the retrieved at least one item based on the user demand; extracting at least one representative word for each of the updated at least one item respectively; building a candidate item list based on the extracted at least one representative word; and generating at least one eliciting question to help the user select an item based on the candidate item list.

According to another embodiment of the present invention, a computer program product comprising of a computer readable storage medium having program instructions embodied therewith, the program instructions executable by a processor to cause the processor to: retrieving at least one item based on a user demand; updating the retrieved at least one item based on the user demand; extracting at least one representative word for each of the updated at least one item respectively; building a candidate item list based on the extracted at least one representative word; and generating at least one eliciting question to help the user select an item based on the candidate item list.

DETAILED DESCRIPTION

Figure 1:
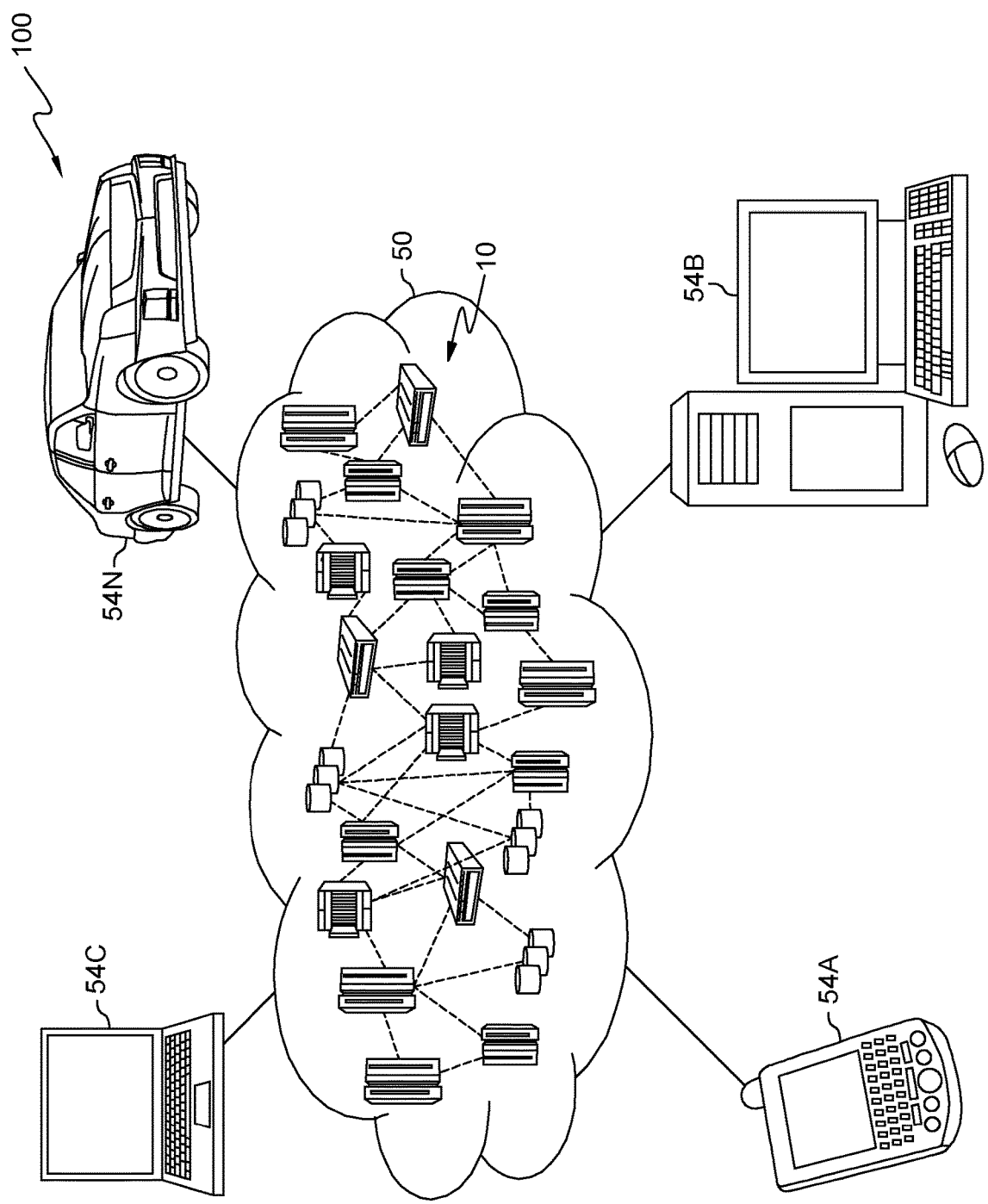
FIG. 1 depicts a cloud computing environment in accordance with an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
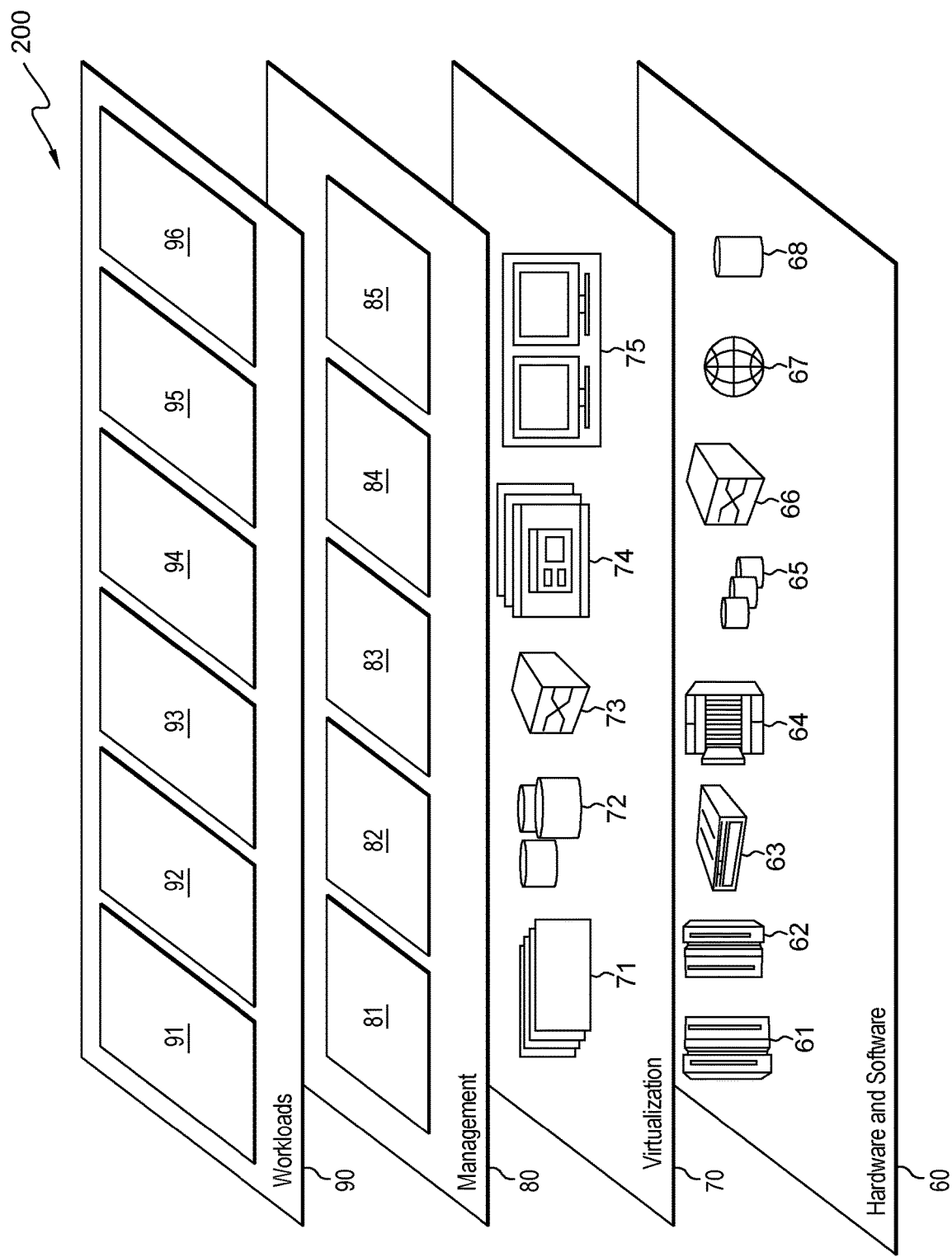
FIG. 2 depicts an abstraction model layers in accordance with an embodiment of the present invention.
Figure 3:
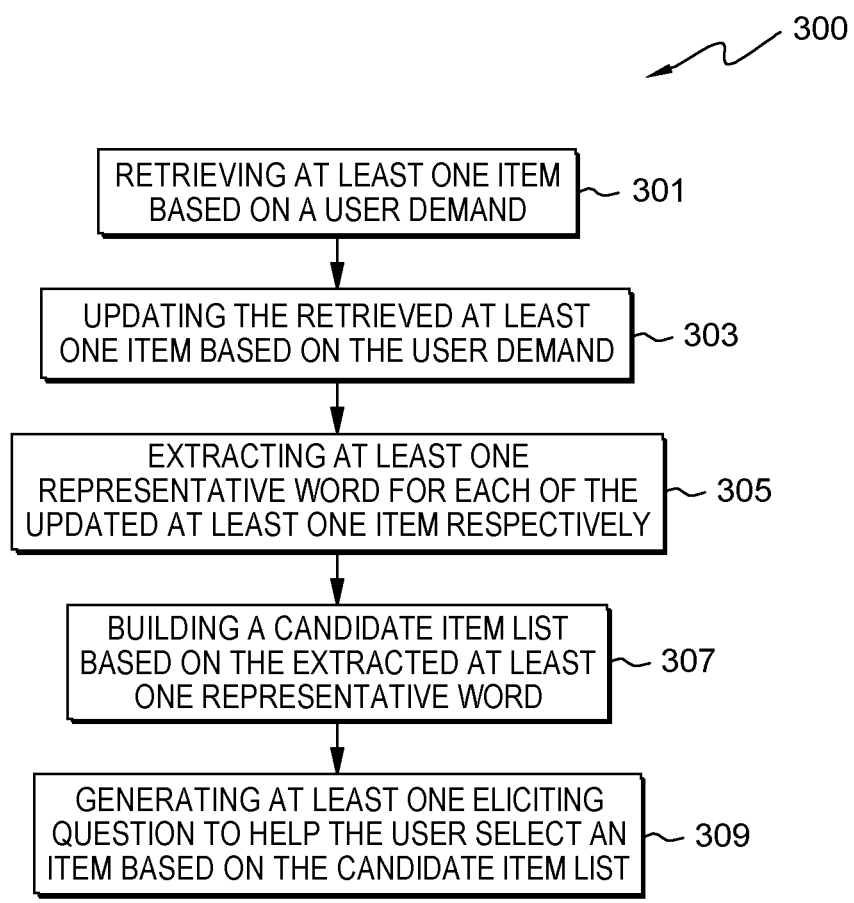
FIG. 3 is a flowchart depicting operational steps of user demand recommendation, in accordance with an embodiment of the present invention.

Referring now to FIG. 2, a set of functional abstraction layers provided by cloud computing environment 50 (FIG. 1) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user demand eliciting and item recommending 96.

Generally speaking, a user can always explain his demands only in natural language in their own vocabularies, referred as 'user language'. The problem is how to transform the demands from 'user language' to 'item language' to enable effective item matching and how to elicit user demand(s) for effective recommending with less interaction.

To solve the problem mentioned above, an embodiment according to present invention is described herein below with reference now to FIG. 3 which is a flowchart illustrating an exemplary method 300 according to an embodiment of the present invention. At block 301, at least one item is retrieved based on a user demand. The user demand can be presented by a demand vector, while the item can be characterized by an item vector. The demand vector and the item vector are generated based on a representation model, and the representation model can be trained by original item reviews. It would be appreciated that, the user demand and the item can be characterized in any other proper forms, which is not limited to vectors. The item can be a product such as a car, a movie or a service such as a booking service etc. Usually, there are many item reviews on the internet, one example of an item review is "Type A car is so cool, fancy and fashion, it's suitable for young couples without children". Item reviews are crawled and then parsed for example using Lucene Tokenizer Algorithm or Solr Tokenizer Algorithm or other proper algorithms in the art. The parsed item reviews are used to train a representation model, for example using Paragraph2Vec Algorithm to generate distributed representations for each item review, and any other proper distributed representation learning algorithms can be used other than Paragraph2Vec Algorithm. The trained representation model can be a function to map each paragraph of the item review to a unique vector, characterized by a column in matrix D and map each of the representative word in the item review to a unique vector, characterized by a column in matrix W. When a user query such as "do you have a good car" is received, the user query will be parsed and a user demand (vector) can be generated based on the parsed user query and the trained representation model.

In the following shows an example of a word vector of a representative word for the representation model: Vword1=<−0.150900 0.273823−0.228213 . . . 0.217080 0.240741>, in the word vector, the value range of each dimension of the word vector is between (−1, 1) with each value has no physical meanings and is only the unique identification in the vector space. Item vectors and demand vectors are similar.

On the other hand, item reviews only for one item (such as the car of type A) can be parsed, and an item vector can be generated based on the parsed item reviews and the representation model. According to one embodiment of the present invention, at least one representative word for each of the at least one item can be generated respectively by matching the at least one item vector with the at least word vector. The distance (e.g., cosine distance) between a user demand vector and an item vector is calculated during the matching process in which if the distance is smaller than a threshold (e.g., 0.1), the user demand vector and the item vector will be determined as matching. Once an item vector has been matched with a user demand, it will be recorded.

At block 303, the retrieved at least one item is updated based on the user demand. According to an embodiment of the present invention, the item is updated by subtracting the demand vector from the retrieved at least one item vector. The purpose of the updating/subtracting is to reduce the search scope of future search.

At block 305, at least one representative word is extracted for each of the updated at least one item respectively. According to an embodiment of the present invention, the at least one item can be matched with the at least one representative word by mapping the updated at least one item vector and the at least one word vector. After the matched at least one word vector is obtained, the representative word corresponding to the word vector is retrieved. If the distance (e.g., cosine distance) between a word vector and an item vector is smaller than a predefined threshold (e.g., 0.1), the word vector and the item can be determined as matching, and then the representative word corresponding to the matched word vector is extracted.

At block 307, a candidate item list is built based on the extracted at least one representative word. In order to build the candidate item list, KD-Tree technology can be leveraged in this disclosure, wherein the candidate item list is a KD-Tree with the extracted representative word(s) as its parent node(s) and items as leaf node(s). It would be appreciated that, KD-Tree technology is just for purpose of description, the present invention is not limited to it and other technology adaptive for this invention, such as Ball-Tree and OC-Tree or any other proper data structure could also be used.

Figure 4:
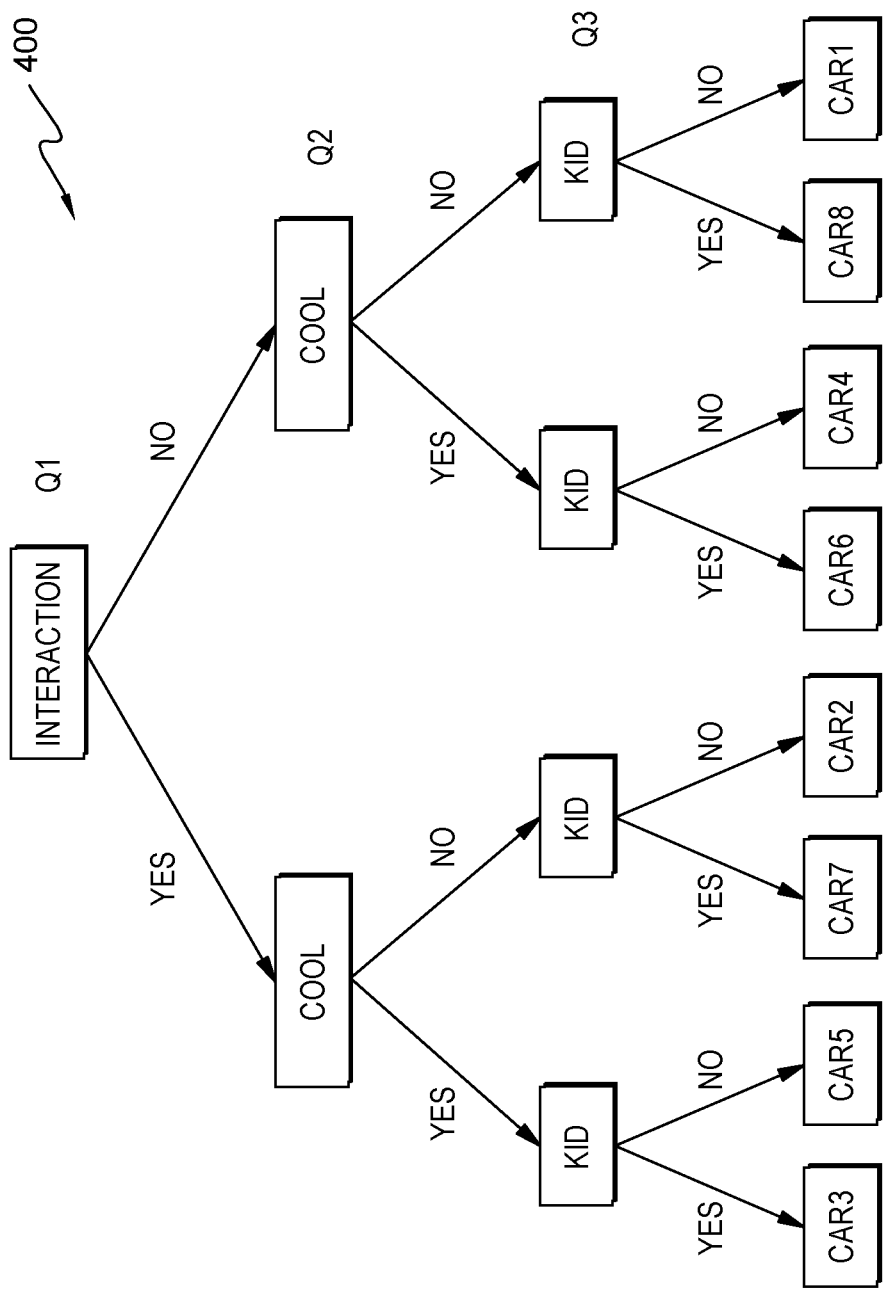
FIG. 4 illustrates a KD-tree for a car.
Figure 5:
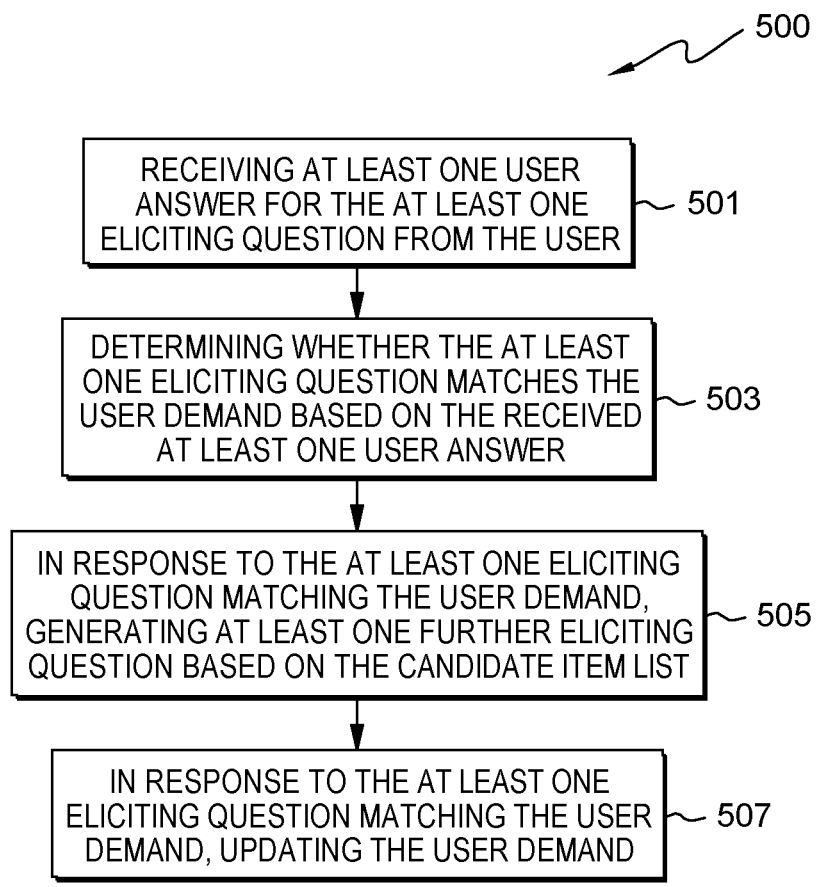
FIG. 5 is a flowchart depicting operational steps of user demand recommendation in another embodiment of the present invention.

Now referring to FIG. 4, which shows a KD-Tree of the built candidate item list for an item 'car'. Based on the at least one representative word generated for item 'car' by matching the at least one item vector with the at least word vector, a table is built to associate a car and at least one representative word. In the table, there is one row for each car, and one column for each representative word. If the m-th car has the n-th representative word, then table cell (m, n) is set to 1, otherwise table cell (m, n) is set to 0. A KD-Tree for the item 'car' can be built based on the table. Then a mapping is built between the extracted at least one representative word and Question for the user. The car's KD-Tree as shown in FIG. 5 is a binary tree in which every non-leaf node is a representative word point and represents a group of cars. Every non-leaf node can be thought as implicitly generating a splitting hyper-plane that divides the space into two parts, known as half-spaces. Points to the left of this hyper-plane are characterized by the left sub-tree of that node and points to the right of the hyper-plane are characterized by the right sub-tree. The hyper-plane direction is chosen in the following way: every node in the tree is associated with one of the k-dimensions, with the hyper-plane perpendicular to that dimension's axis. So, for examples, if for a particular split of a the representative word—"cool" axis is chosen, the car with the representative word—"cool" will appear in the left sub-tree and the car without the representative word—"cool" will appear in the right sub-tree. Then the left sub-tree and right sub-tree will further be split by another representative word—e.g., "kid". Each type of car is related to several representative words such as "interaction", "cool", "kids", and the representative words can be associated to the questions such as Q1: "Do you have other requirements such as interaction capability?", Q2: "Do you have other requirements such as the car should be cool?" or Q3: "Do you have other requirements such as often driving kids to school?" according to the mapping built above.

Now referring back to the block 309 of FIG. 3, at this block, at least one eliciting question is generated to help the user select an item based on the candidate item list. Based on the KD-Tree shown in FIG. 4, the questions Q1, Q2 and Q3 etc. can be prompted to the user according to the user's input, which will help the user select an item to meet his/her demand(s).

Referring to FIG. 4, one embodiment of this disclosure can be explained by an example interaction with the user as below. This example is described on semantic level in order to make this disclosure to be understood easily. Wherein [User] refers to a user input, it can be characterized as the user demand vector as above. [System] refers to the computer system implementing the method of one embodiment. Car i refers to the item i, for instance, Car 1 (a hatchback car): good, fashion, compact, economy refers to car item 1 with representative words as <good, fashion, compact, economy>, and Car 1 is a hatchback car, the representative words can be characterized as the word vector and Car i can be characterized as an item vector as above.

Interaction Example 1

[User]: Do you have a good car?
[System]: Yes, we have. Do you have other requirements such as interaction capability?//It's the result of following Step 1-3.
Step 1: 8 cars are selected based on the "good" representative word matching:
Car 1 (a hatchback car): good, fashion, compact, economy
Car 2 (a notchback car): nice, interaction, fashion, mid-class, economy
Car 3 (a SUV (Sport Utility Vehicle)): wonderful, interaction, yawing, all wheel driven, safety protection equipment, family, cool
Car 4 (a SUV): beautiful, yawing, all wheel driven, safety protection equipment, cool
Car 5 (a sports car): excellent, interaction, cool, sense of speed, purified air, hormone, sports
Car 6 (a sports car): good, cool, sense of speed, hormone, sports
Car 7 (a MPV (Multi-Purpose Vehicle)): nice, interaction, spacious, kids, family, extensible
Car 8 (a MPV): excellent, spacious, kids, family
Step 2: Vector Subtraction (//all car vectors are subtracted by the vector of "good"):
Car 1 (a hatchback car): fashion, compact, economy
Car 2 (a notchback car): interaction, fashion, mid-class, economy
Car 3 (a SUV): interaction, yawing, all wheel driven, safety protection equipment, family, cool
Car 4 (a SUV): yawing, all wheel driven, safety protection equipment, cool
Car 5 (a sports car): interaction, cool, sense of speed, purified air, hormone, sports
Car 6 (a sports car): cool, sense of speed, hormone, sports
Car 7 (a MPV): interaction, spacious, kids, family, extensible
Car 8 (a MPV): spacious, kids, family
Step 3: Build a KD-tree based on these 8 cars as FIG. 5, and identifies the recommends the representative word "interaction" to form the next question.
[User]: Yes, I want the interaction capability.
[System]: Great. We have Car 2, Car 3, Car 5 & Car 7. Do you have other requirements such as the car should be cool?//It's the result of following step 1-2
Step 1: 4 cars are selected based on the "interaction" representative word matching:
Car 2 (a notchback car): fashion, mid-class, economy
Car 3 (a SUV): yawing, all wheel driven, safety protection equipment, family, cool
Car 5 (a sports car): cool, sense of speed, purified air, hormone, sports
Car 7 (a MPV): spacious, kids, family, extensible
Step 2: Using the representative word "cool" to form the next question.
[User]: Yes
[System]: OK We have Car 3 & Car 5. Do you have other requirements such as often driving kids to school?//It's the result of following step 1-2
Step 1: 2 cars are selected based on the "cool" representative word matching:
Car 3 (a SUV): yawing, all wheel driven, safety protection equipment, family
Car 5 (a sports car): sense of speed, purified air, hormone, sports Step 2: Using the keyword "kids" to form the next question.
[User]: No
[System]: OK, Car 5 is recommended to you!
1 car are selected based on the "kids" representative word matching:
Car 5 (a sports car): sense of speed, purified air, hormone, sports It should be appreciated that, interaction example 1 is used to make the skilled person in the art understand this disclosure easily, which is not intended to limited this disclosure.

Now referring to FIG. 5, FIG. 5 shows another embodiment of this disclosure. Sometimes, the user is not so certain of his/her demand. When he/she answers the soliciting questions, his/her demand may change dynamically. It may be valuable to catch such kind of demand change and help the user efficiently.

At block 501, at least one user answer for the at least one eliciting question is received from the user. At block 503, it can be determined whether the at least one eliciting question matches the user demand based on the received at least one user answer. If the at least one eliciting question is not matched with the user demand, it is reported that the user demand has changed. First, at least one user answer is analyzed by constructing a user selection path. It should be appreciated that, the user answer can be analyzed in any other proper ways, the User Selection Path method is only to make the skilled person understand this disclosure easily, which is not intended to limited this disclosure. The User Selection Path can be defined as USPu={<d1, p1, r1>, <d2, p2, r2>, . . . , <di, pi, ri> . . . , <dn, pn, rn>}, i and n are natural numbers, di is referred to the latest user demand estimation at node ni (e.g., a queue recording all valid user input, each time when there is a new user input, it will be added to the queue if there is no conflict, otherwise, it will first solve conflict in the queue by removing conflict user input, and then add the new user input into the queue), pi is referred to the position of user demand vector at node ni, which can be characterized by a n-dimensional real-valued vector, and ri is referred to user selection range at node ni. ri is a threshold value which is calculated in algorithm (1) as below. Alternatively, the USPu can also be defined as USPu={<p1, r1>, <p2, r2>, . . . , <pi, ri> . . . , <pn, rn>} or even as USPu={p1, p2, . . . , pi . . . , pn}. The USPu can be generated following the steps as below: determining at least one latest user demand and at least one corresponding user selection range, generating at least one new user demand based on previous determined user demand and user answer to the at least one further eliciting question, and generating at least one new user selection range, and then the USPu can be generated based on the at least one latest user demand and user selection range, the at least one new user demand, and the at least one new user selection range. The determining comprises responding to the range of the current node of the user selection path being above a predefined threshold, determining the at least one eliciting question being not matched with the user demand. The following algorithm (1) explained the details:

Algorithm (1) - Detecting_User Demand Change (USPu)

Let i be the length of USPu;
if i = 1, do the initialization
    $d_0$ = {user_demand};  // this is the initial user demand
    $p_0$ = position representation of user demand $d_0$; // user demand vector
    $r_0$ = initial range value (e.g., 10);
else
    Let $n_i$ be the current node <$d_i$, $p_i$, $r_i$>, $n_{i-1}$ be the previous node <$d_{i-1}$, $p_{i-1}$, $r_{i-1}$>;

-continued

Algorithm (1) - Detecting_User Demand Change (USPu)

$d_i = d_i \cup \{\text{new user demand}\}$;
$p_i$ = position representation of user demand $d_i$;
if distance($p_i$, $p_{i-1}$) ≤ $r_{i-1}$, then  // within the threshold
    $r_i = r_{i-1}/2$;
else if distance($p_i$, $p_{i-1}$) > $r_{i-1}$, then  // over the threshold
    $r_i = r_{i-1} * 2$;
    report user demand change;
Add <$d_i$, $p_i$, $r_i$> to USPu.

In Algorithm (1), function distance calculates the distance (e.g., cosine distance) for two vectors.

At block 505, in response to the at least one eliciting question matching the user demand, at least one further eliciting question is generated based on the candidate item list, as shown in algorithm (1).

At block 507, in response to determining that the at least one further eliciting question does not match the user demand, updating the user demand based on the user selection path, as shown in algorithm (1), thus the user demand is a new demand and the user can return to the block 301 of FIG. 3 to begin a new query with the new demand identified by the system of this disclosure.

One embodiment of this disclosure can be explained by an example interaction with the user as below. In this embodiment, the user demand change is catched and the demand changed is also met.

Interaction Example 2

[User]: Do you have a good car?
[System]: Yes, we have. Do you have other requirements such as interaction capability?
[User]: Yes, I want the interaction capability.
[System]: Great. We have Car 2, Car 3, Car 5 & Car 7. Do you have other requirements such as the car should be cool?
[User]: Oh, I prefer the compact size. (User demand Change Monitored) 2 car are selected based on the "compact" representative word matching:
Car 1 (a hatchback car): good, fashion, compact, economy
Car 9 (a hatchback car): compact, economy, easy parking
Build another KD-tree based on these 9 cars, and identifies the representative word "fashion" to form the next question.
[System]: OK We have Car 1 & Car 9. Do you have other requirements such as a fashion car?
[User]: Yes
[System]: OK, Car 1 is recommended to you!
It should be appreciated that, interaction example 2 is used to make the skilled person in the art understand this disclosure easily, which is not intended to limited this disclosure.

Figure 6:
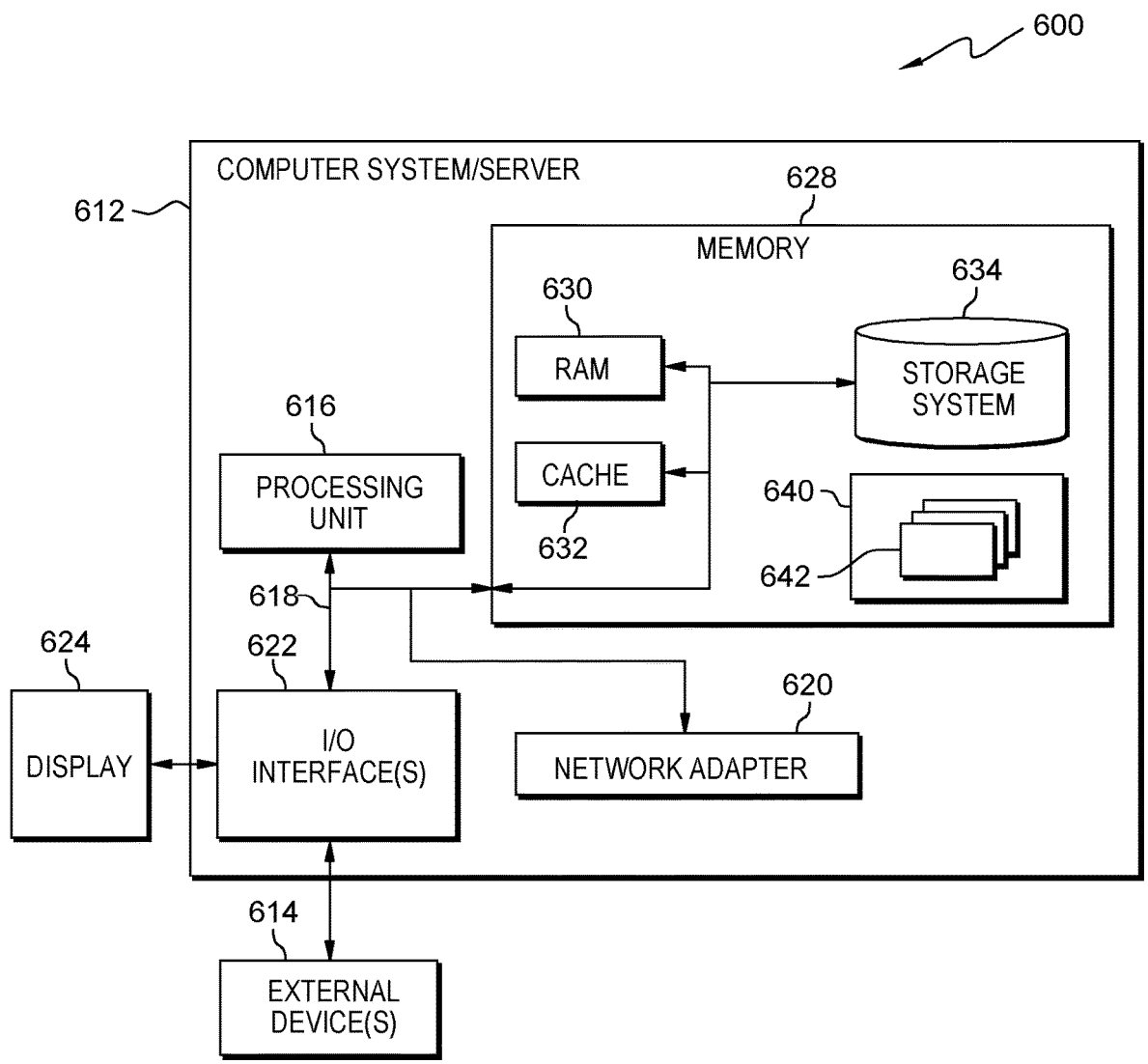
FIG. 6 depicts a cloud computing node in accordance with an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which can also be adapted to depict an illustrative example of a portable electronic device such as a communication device being applicable to implement the embodiments of the present invention, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for user demand recommendation, the method comprising:
    retrieving, by one or more computer processors and by using a Solr Tokenizer Algorithm one or more items based on a user demand;
    updating, by the one or more computer processors, the one or more items based on the user demand;
    extracting, by the one or more computer processors, one or more representative words corresponding to the one or more items;
    building, by the one or more computer processors, a candidate item list based on the one or more representative words, wherein the candidate item list is a KD-tree with the representative word as one or more parent nodes and the item as one or more leaf nodes; and
    generating, by the one or more computer processors, one or more eliciting questions to help a user select an item based on the candidate item list;
    receiving, by one or more computer processors, one or more user answers based on the one or more eliciting questions from the user;
    determining, by one or more computer processors, whether the one or more eliciting questions match the user demand based on the one or more user answers further comprising:
        constructing, by one or more computer processors, a user selection path, wherein the user selection path is defined by an algorithm:
            $USPu = \{p1, p2, \ldots, pi \ldots, pn\}$, wherein i and n are natural numbers, pi is a position of user demand vector at node ni, and pn is a position of user demand vector at node ni;
        determining, by one or more computer processors, whether a range of a current node of the user selection is above a predefined threshold;
        updating, by one or more computer processors, the user demand based on the user selection path, wherein updating further comprises subtracting, a demand vector from an item vector; and
        responsive to determining the range of the current node of the user selection is above the predefined threshold, determining, by one or more computer processors, that the one or more additional eliciting questions does not match the user demand; and
        responsive to the one or more eliciting questions matching the user demand, generating, by one or more computer processors, one or more additional eliciting questions based on the candidate item list.

2. The method of claim 1, wherein the user demand is characterized by a demand vector, the representative word is characterized by a word vector and the item is characterized by an item vector.

3. The method of claim 2, wherein the demand vector, the item vector and the word vector are generated based on a model trained by reviews of the one or more items.

4. The method of claim 2, wherein extracting one or more representative words corresponding to the one or more items further comprises:
    matching, by one or more computer processors, the one or more item vectors with the one or more representative word vectors.

5. The method of claim 1, wherein the constructing the user selection path further comprises:
    determining, by one or more computer processors, the one or more latest user demands and one or more corresponding user selection ranges;
    generating, by one or more computer processors, the one or more new user demands based on the previously determined user demand and the user answer wherein the user answer is based on the one or more additional eliciting questions;
    generating, by one or more computer processors, the one or more new user selection ranges;
    generating, by one or more computer processors, the user selection path based on the one or more latest user demands, the one or more user selection ranges, the one or more new user demands, and the one or more new user selection ranges.

6. A computer program product for user demand recommendation, the computer program product comprising:
    one or more computer readable storage device and program instructions stored on the one or more computer readable storage device, the stored program instructions comprising:
    program instructions, based on Solr Tokenizer Algorithm, to retrieve one or more items based on a user demand;
    program instructions to update the one or more items based on the user demand;

program instructions to extract one or more representative words corresponding to the one or more items;

program instructions to build a candidate item list based on the one or more representative words, wherein the candidate item list is a KD-tree with the representative word as one or more parent nodes and the item as one or more leaf nodes;

program instructions to generate one or more eliciting questions to help the user select an item based on the candidate item list;

program instructions to receive one or more user answers based on the one or more eliciting question from the user;

program instructions to determine whether the one or more eliciting questions match the user demand based on the one or more user answers further comprising:

program instructions to construct a user selection path, wherein the user selection path is defined by an algorithm:

$USPu=\{p1, p2, \ldots, pi \ldots, pn\}$, wherein i and n are natural numbers, pi is a position of user demand vector at node ni, and pn is a position of user demand vector at node ni;

program instructions to determine, whether a range of a current node of the user selection is above a predefined threshold;

program instructions to update the user demand based on the user selection path, wherein update further comprises subtracting, a demand vector from an item vector; and responsive to determining the range of the current node of the user selection is above the predefined threshold, program instructions to determine that the one or more additional eliciting questions does not match the user demand; and responsive to the one or more eliciting questions matching the user demand, program instructions to generate one or more additional eliciting questions based on the candidate item list.

7. The computer program product of claim 6, wherein the user demand is characterized by a demand vector, the representative word is characterized by a word vector and the item is characterized by an item vector.

8. The computer program product of claim 7, wherein the demand vector, the item vector and the word vector are generated based on a model trained by reviews of the one or more items.

9. The computer program product of claim 7, wherein the program instructions to extract one or more representative words corresponding to the one or more items further comprises:

program instructions to match the one or more item vectors with the one or more representative word vectors.

10. The computer program product of claim 6, wherein the constructing the user selection path further comprises:

program instructions to determine the one or more latest user demands and one or more corresponding user selection ranges;

program instructions to generate the one or more new user demands based on the previously determined user demand and the user answer wherein the user answer is based on the one or more additional eliciting questions;

program instructions to generate the one or more new user selection ranges;

program instructions to generate the user selection path based on the one or more latest user demands, the one or more user selection ranges, the one or more new user demands, and the one or more new user selection ranges.

* * * * *